United States Patent [19]

Tilby

[11] 3,873,033

[45] Mar. 25, 1975

[54] METHODS AND APPARATUS FOR PREPARING SUGARCANE STALKS FOR SUBSEQUENT PROCESSING

[75] Inventor: Sydney Edward Tilby, Winterburn, Alberta, Canada

[73] Assignee: Canadian Cane Equipment Ltd., Edmonton, Alberta, Canada

[22] Filed: Apr. 26, 1973

[21] Appl. No.: 354,775

[52] U.S. Cl.................... 241/19, 83/98, 83/436, 127/2, 209/106, 209/133, 241/79, 241/81
[51] Int. Cl................... A01d 55/00, B02c 18/00
[58] Field of Search............ 83/22, 24, 26, 98, 177, 83/356.3, 436; 241/19, 24, 60, 61, 79, 79.1, 80, 82, 81; 127/2; 209/263, 106, 136

[56] References Cited
UNITED STATES PATENTS

| | | | |
|---|---|---|---|
| 3,512,564 | 5/1970 | Kerhan | 241/79 |
| 3,608,597 | 9/1971 | Hill | 241/79 |
| 3,690,358 | 9/1972 | Tilby | 241/60 X |
| 3,756,368 | 9/1973 | Lent | 209/106 X |

*Primary Examiner*—Willie G. Abercrombie
*Attorney, Agent, or Firm*—Burns, Doane, Swecker & Mathis

[57] ABSTRACT

Improvements are described in methods and apparatus for preparing a trash-containing mass of randomly oriented slender cane stalks for subsequent processing. The overall method and apparatus described includes the steps of, and means for, conveying the trash-containing mass of randomly oriented cane stalks; raking the mass of stalks at some point during conveyed travel thereof; and aligning substantially all of the stalks longitudinally in the direction of travel so that they may be choppped into shorter lengths. At selected points, trash is removed from the mass of stalks. The improvements described include the steps of, and means for, conveying the stalks over a transfer drum which has a plurality of arms arranged to engage the mass of stalks to assist in raking and thinning the stalks as they pass over the drum, and to drop the stalks into a gap, or vertical discontinuity, in the conveyor means. As the stalks drop downwardly through the gap, a fluid stream preferably a gas such as air, is directed downwardly and laterally through the stalks to disengage trash from the mass of stalks. The directed fluid stream conveys trash entrained therein out of the discontinuity and against a series of vertically hanging free-swinging rod members which serve to screen trash from the directed fluid, with the trash dropping downwardly out of the directed fluid stream. The trash may then be conveyed away from the stalk conveying means for further disposal.

The stalks which have dropped downwardly through the fluid stream are picked up again by a stalk conveying means and delivered to another detrashing station downstream of the transfer drum and upstream of the chopping apparatus. Here, the mass of stalks is conveyed between superposed rollers to a junction point. At this junction point the mass of stalks is deflected upwardly into an additional pair of superposed rollers. The additional pair of rollers is operable to move the mass of stalks along an upwardly inclined path of travel, while trash such as rocks engage the lower one of the additional pair of rollers at the junction and drop downwardly out of the mass of stalks. The aligned and detrashed mass of stalk material is suitable for being chopped into shorter, substantially uniform, lengths and subsequently being realigned, longitudinally split, and depithed.

18 Claims, 12 Drawing Figures

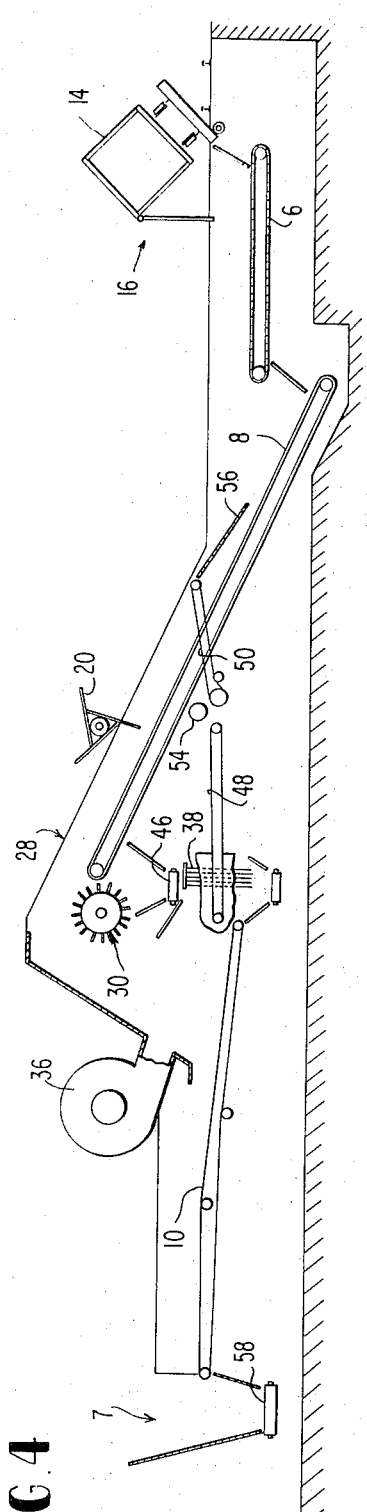
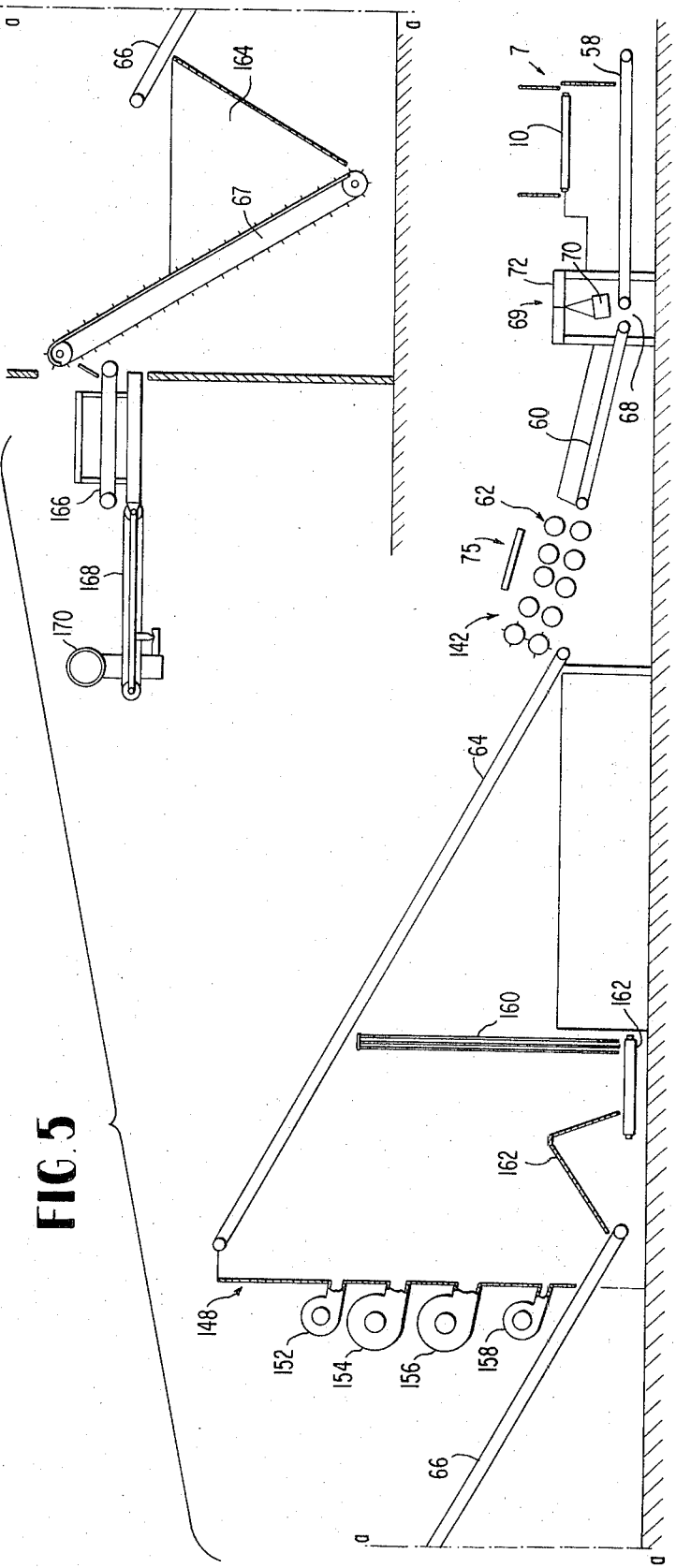
FIG. 4
FIG. 5

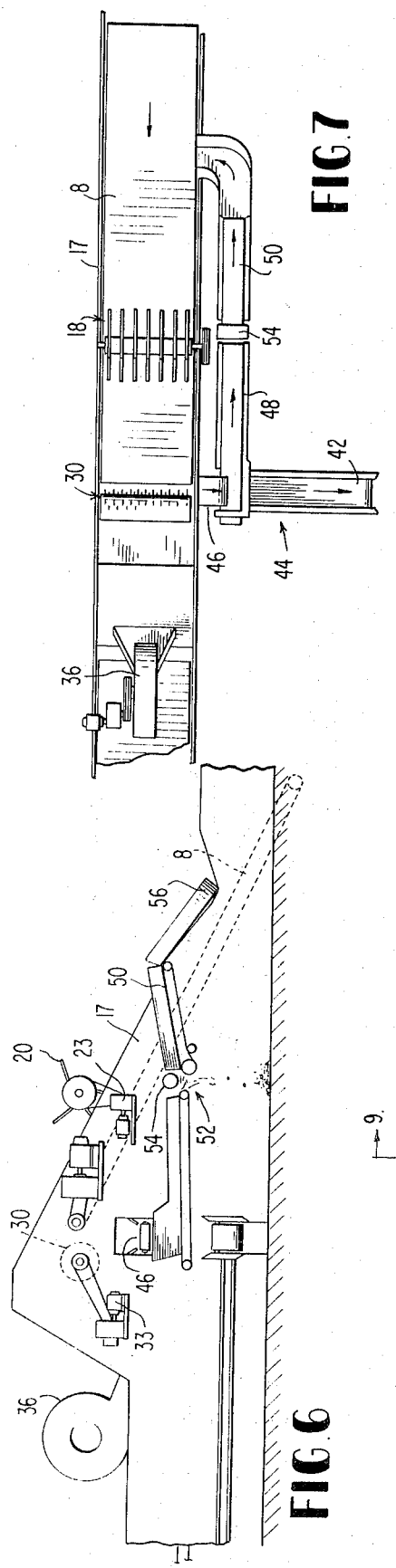
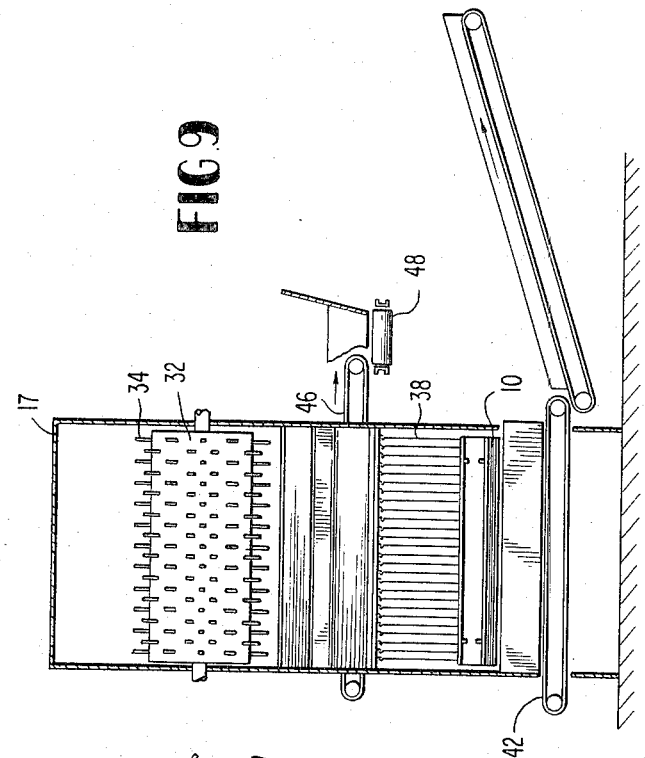
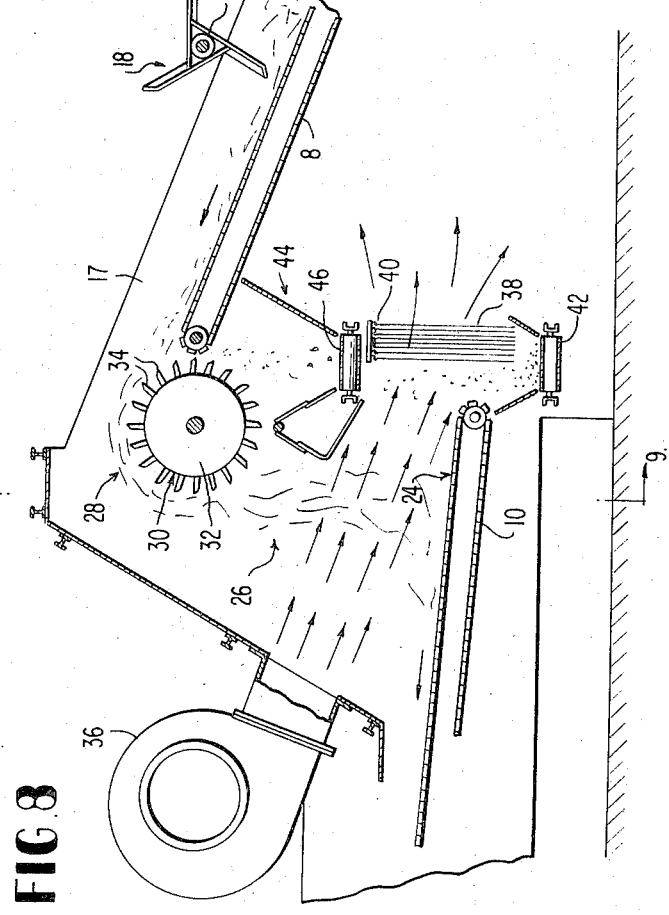

METHODS AND APPARATUS FOR PREPARING SUGARCANE STALKS FOR SUBSEQUENT PROCESSING

BACKGROUND OF THE INVENTION

1. Field of the Invention

This invention relates to improvements in the preparation of cane stalks for subsequent processing.

More particularly, this invention relates to improvements in method and apparatus intended to receive a trash-containing mass, or bulk load, of randomly oriented sugarcane stalks and to thereafter deliver the stalks to a selected work station in an aligned and generally cleaned condition ready for being chopped into generally uniform, relatively shorter lengths.

2. Summary of the Prior Art

The present invention is described herein with reference to improvements in an aligning and detrashing (cleaning) portion of an overall system for processing sugarcane. The system, as a whole, may embrace various stages involving cleaning, aligning, chopping, longitudinal splitting, and depithing of the stalks, typically in combination with subsequent separation of the sugar juice from the pith. Such systems in whole or in part are described, for example, in U.S. Pat. Nos. 3,424,611; 3,424,612; 3,464,877; 3,464,881; 3,566,944; 3,567,510 and 3,567,511, all of which are assigned to the assignee of the present invention and are incorporated herein by reference.

The feeding and detrashing portions of such systems are intended to receive a bulk load of stalks from a suitable source, such as a rail car or any other conventional source of delivery of sugarcane from the fields, and to deliver the stalks to a work station in generally cleaned and aligned condition, ready for being chopped into generally uniform, relatively shorter lengths.

In preparing sugarcane stalks for subsequent processing, it has been known to utilize machinery adapted to automatically cut the cane stalks (which frequently grow in a bent and distorted configuration) into shorter lengths to facilitate subsequent processing. It has also been known to combine cutting of the stalks with a trash removal operation by blowing air laterally or upwardly through the mass of stalks to carry away trash. In this connection, reference may be made to U.S. Pat. Nos. 2,621,461; 2,544,275; 1,990,172 and 402,082.

Such previous devices may not, however, prove suitable for the preparation of masses of randomly oriented sugarcanes, delivered in bulk, during the performance of large-scale sugar processing operations. For example, such prior devices have generally been adapted to receive stalks arranged in some form of pre-existing parallel alignments (either, for example, growing upright in rows in the fields or already cut down by laborers and laid in horizontal, parallel rows) thereby permitting the stalks to be fed transversely of their length directly to cutting knives usually disposed in spaced parallel relation. Such prior devices would not be suitable for dealing with a large, tangled mass of randomly oriented sugarcane stalks such as would be dumped in bulk from a railway car or the like. Furthermore, even if such randomly oriented stalks were fed directly into spaced parallel cutting knives, it is likely that a significant proportion of the stalks, due to this random orientation of the stalks, would encounter the knives at relatively oblique inclinations so that the chopped stalks would be of widely varying, unequal lengths.

More recently, the art has provided systems for thinning and aligning cane stalks delivered in bulk so that they may be fed more uniformly to cutting knives to provide more uniform chopped lengths of stalk. In this connection, reference may be made to the above-mentioned U.S. Pat. No. 3,566,944, as well as U.S. Pat. No. 3,512,564.

Such previous thinning and aligning systems have also been combined with trash removal operations, for a continuing problem particularly associated with bulk masses of sugarcane stalks transported from the fields arises due to the presence, amongst the stalks, of heavy trash or debris such as large rocks, boulders, scrap metal, and the like. If not removed, such trash can cause serious damage to portions of the apparatus, such as the chopping and splitting blades, for example. It is advisable, therefore, that provision be made for the removal of such unwanted, heavy trash from the mass of stalks. Other lighter trash such as leaves, broken fragments of stalk, dirt, cane roots and the like are also advisably removed to facilitate subsequent processing of the stalks.

Such previous devices, although useful, have attempted to remove trash by directing fluid laterally and upwardly through airborne, e.g., freefalling, cane stalks to remove trash therefrom. However, the efficiencies of separation are lowered due to oppositely directed forces stemming from gravity and the moving stalks themselves. Further, such devices have employed conventional mesh screens to separate the trash from the directed fluid, but these screens have a tendency to become clogged with trash unless elaborate precautions are taken, e.g., using screens of the endless conveyor type such as shown in U.S. Pat. No. 3,358,830. Using such endless screens tends to increase power requirements, which could pose a significant economic factor in many cane growing regions.

Other known detrashing efforts have included the gravity type wherein the mass of stalks is passed over a series of endless conveyors which are spaced apart from each other, thereby tending to cause debris such as rocks and dirt to gravitate downwardly through the gaps in the conveying apparatus. In this connection, see the above-mentioned U.S. Pat. Nos. 3,566,944 and 3,358,830, as well as some somewhat similar devices used in other environments such as the beet cleaning operations described in U.S. Pat. Nos. 2,997,086 and 3,217,346.

While these detrashing devices are also useful, efficiencies of separation are lowered due to trash such as rocks and the like being carried over the gaps with the cane stalks due to the momentum imparted by the conveyors. Widening of the gaps tends to alleviate this "carrying over" effect, but increasing the gap width also increases the chances of cane stalks falling down through the gaps with a concomitant loss in production efficiencies.

For these, and other reasons, the search has continued for improved methods and apparatus for receiving a bulk mass of randomly oriented sugarcane stalks, detrashing the cane, that is, removing most of the extraneous material such as rocks, field dirt, tramp metal and leaves, and then delivering the cane for subsequent processing.

SUMMARY OF THE INVENTION

Accordingly, a general object of the present invention is to provide methods and apparatus for preparing a trash-containing mass of randomly oriented cane stalks for subsequent processing, which methods and apparatus are intended to prevent or substantially alleviate problems of the type previously described.

Another object of the present invention is to provide methods and apparatus for preparing a trash-containing mass of randomly oriented slender sugarcane stalks for subsequent longitudinal splitting and depithing of each individual stalk.

Another object of the present invention is to provide methods and apparatus for the removal of trash and other debris from among sugarcane stalks.

In accordance with one aspect of the present invention, an improved apparatus for preparing a trash-containing mass of randomly oriented cane stalks for subsequent processing is provided. The improved apparatus includes a detrashing station for removing trash from the mass of stalks, the station including at least one initial, coacting pair of rollers arranged to rotate in a first direction of stalk travel. The initial roller pair comprises an upper roller superposed vertically above a lower roller such that the roller pair is adapted to positively engage and convey the mass of stalks therebetween. This coacting roller pair defines the first direction of stalk travel to a junction of at least one additional pair of vertically superposed, coacting rollers arranged to rotate in a second direction of stalk travel. The additional roller pair is disposed adjacent the initial roller pair to positively engage and convey the mass of stalks between its upper and lower rollers in the second direction from the junction. This second direction of stalk travel is inclined upwardly from the first direction such that the lower roller in the additional roller pair functions as an abutment to deflect downwardly nonflexible trash material such as rocks.

In a further, related aspect of the present invention, the at least one additional roller pair includes two roller pairs to positively convey the stalks from the junction, the axes of rotation for all the rollers being parallel to each other. The rollers may include resilient gripping surfaces for frictionally gripping and advancing the stalks. In each roller pair, the upper roller is preferably resiliently mounted and yieldably biased in a direction toward its associated lower roller.

In another aspect of the present invention, provision is made of an improved cane processing apparatus which includes raking means for assisting in thinning the mass of stalks in their direction of travel and in spreading the mass of stalks laterally of the direction of travel. Also provided are fluid detrashing means for directing fluid through the mass of stalks at some point during their travel to remove trash. The raking means include a transfer drum disposed at a transfer point immediately adjacent a downstream end of a conveying means and arranged to rotate in the direction of conveyed stalk travel. The transfer drum receives and conveys stalks of cane over the drum and drops the stalks into a vertically extending gap between conveyors. The transfer drum has an axis of rotation oriented transversely to the stalk travel direction and also has a plurality of arms rigidly attached thereto and projecting outwardly therefrom to engage the mass of stalks during its conveyed travel to assist in conveying the stalks over the drum and into the gap. A fluid detrasher is disposed adjacent the transfer drum and directs fluid, preferably air downwardly and laterally through the stalks as they drop through the gap. The directed fluid disengages trash from the mass of stalks and downwardly and laterally conveys the trash against a series of vertically hanging free-swinging rod members which extend vertically adjacent the gap. The rod members are arranged to receive and screen trash from the directed fluid such that the trash drops downwardly out of the fluid stream.

In a further aspect of the present invention, recycle conveyor means are positioned vertically below the transfer point and are operable to receive stalk material falling between the transfer drum and the downstream end of the conveyor means and deposit this fallen stalk material on the conveyor means upstream of the transfer point.

An additional aspect of the present invention relates to the provision of magnetic flux producing means upstream of the chopping means and for magnetically attracting metallic trash from the mass of stalks.

In a method aspect of the invention, a trash-containing mass of randomly oriented cane stalks is detrashed by positively conveying the cane stalks between at least one initial pair of coacting upper and lower superposed rollers. This initial roller pair defines a first direction of stalk travel to a junction of at least one additional pair of vertically superposed rollers. The cane stalks are then positively conveyed by the additional pair of rollers from this junction in a direction which is inclined upwardly from the first direction. The lower one of the additional roller pair at the junction functions as an abutment to deflect downwardly nonflexible trash material such as rocks.

In another method aspect of the subject invention, a trash-containing mass of randomly oriented sugarcane stalks is raked by providing a transfer drum at a transfer point disposed between two conveyors. The drum is rotated in the direction of stalk travel to convey the stalks of cane over the drum and into a vertically extending discontinuity between the conveyors. The drum rotation causes rigid arms on the drums to engage the mass of stalks during conveyed travel to assist in conveying the stalks over the drum and into the discontinuity. Fluid is directed downwardly and laterally through the stalks as they drop through the discontinuity, the stalks falling onto the lower conveyor means for further conveying. The directed fluid disengages trash from the mass of stalks and conveys the trash out of the discontinuity and against a series of vertically free-hanging rod members. By means of the rod members, the trash is screened from the fluid and is allowed to drop by gravity out of the fluid stream.

In a further, related method aspect of the present invention, stalk material falling between the transfer drum and the conveyor at the transfer point is recycled to an upstream conveying point.

In yet another method aspect of the present invention, trash is magnetically attracted from the mass of the stalks during its conveyed travel by magnetic flux producing means.

Other objects, aspects and advantages of the present invention will become apparent to one skilled in the art from the following description of the preferred embodiments when read in conjunction with the accompanying drawings.

DRAWINGS

In disclosing the invention, reference will be made to the preferred embodiment shown in the appended drawings.

In the drawings:

FIG. 4 is a side elevational, schematic view of a first conveyor series, taken along the line 4—4 of FIG. 1, with a recycle conveyor system being included for clarity of illustration.

FIG. 5 is a side elevational, schematic view of a second conveyor series portion, taken along the line 5—5 of FIG. 1.

FIG. 6 is a side elevational, schematic view of a portion of the first conveyor series, including a re-cycle conveyor system thereof.

FIG. 7 is a top, schematic view of a portion of the first conveyor series, including the re-cycle conveyor system thereof.

FIG. 8 is a side elevational schematic view of a raking and fluid detrashing station of the first conveyor series.

FIG. 9 is a view of the raking and detrashing station of FIG. 8 taken along the line 9—9 thereof.

DETAILED DESCRIPTION OF THE PREFERRED EMBODIMENTS OF THE INVENTION

Figure 1:
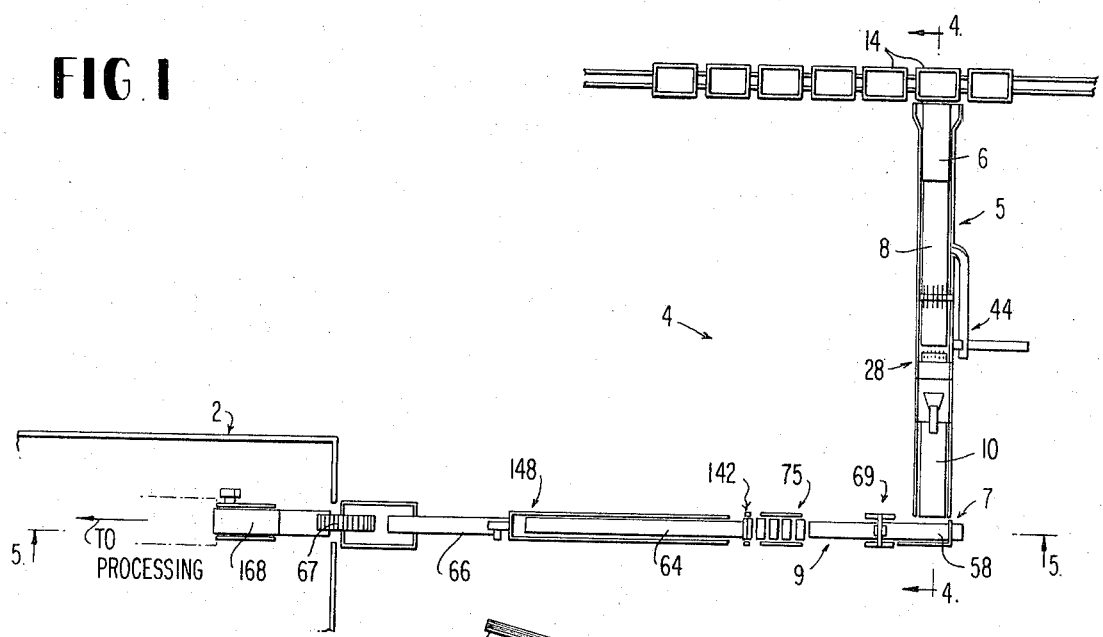
FIG. 1 is an overall, top, schematic view of a sugarcane stalk transfer system in accordance with the invention.

Referring to FIG. 1 of the drawings, a sugarcane processing plant, generally designated at 2, is shown as utilizing a transfer system 4 to supply sugarcane to the plant.

The sugarcane processing plant may include a separation unit for splitting individual cane stalks longitudinally and separating the cane rind from the pith (core material of the cane), and subsequently feeding separated pith, rind, and epidermis portions of the cane to separate pith, rind, and epidermis treatment units.

It will be appreciated, however, that the transfer system 4 of the present arrangement may alternatively be used to supply cane to other known forms of sugarcane processing plants, as desired.

The transfer system 4 of the present invention includes a first series conveyor assembly 5 comprising a plurality of successively related, separate conveyors 6, 8, and 10 arranged to convey cane stalks in large, randomly oriented, bulk masses dumped from rail cars 14 at a dumping station. The separate conveyors in the first series assembly 5 are oriented and operated in a manner tending to spread out and align the randomly oriented stalks within the mass of stalk material, and to remove light and heavy debris which may be mixed therein. In this connection, the first series of 5 of conveyors includes a raking and detrashing station 28 where the stalk material is untangled, thinned out, and subjected to a fluid detrashing operation where light trash material is removed from the mass of stalks.

From this station 28 the stalks are conveyed through a right-angle junction 7 where the stalks are further untangled, spread-out, and generally aligned in the direction of travel for being fed upon a second conveyor series 9.

The aligned stalks are subsequently directed to a magnetic detrashing station 69 where metallic trash is removed from the stalk material.

Downstream of the magnetic detrashing station the stalk material is fed through a conveyor detrashing station 75 where additional remaining trash is separated.

Upon being discharged from the detrashing conveyor station 75, the stalks are directed through a chopping station 142 where they are cut transversely into generally uniform portions.

The chopped stalk portions are then conveyed to a second fluid detrashing station 148 where remaining pieces of light debris are removed from the stalk portions. From this point the detrashed stalk portions are conveyed to the plant 2 for further processing.

THE FIRST SERIES OF CONVEYORS

The previously mentioned first series 5 of conveyors includes a plurality of power driven, separate, endless conveyors 6, 8, and 10 mounted on conventional base framework 17. These conveyors are arranged to successively convey the stalk material from the dumping station 16 toward the right-angle junction 7. Each of the conveyors in the first series is preferably of a heavy-duty-construction slatted belt-type comprising a plurality of slats extending transversely of the direction of motion of the conveyor and joined together by flexible connections along their adjacent longitudinal edges.

The first series of conveyors includes a horizontally disposed cane table 6, the first conveyor in the series, positioned to receive intermittently dumped bulk loads of sugarcane stalks which may comprise several tons. Such loads are supplied from a suitable conventional source of supply, such as for example, the previously mentioned rail car 14 which, as illustrated in FIG. 4, may be of the side unloading, tilt type. It will be appreciated that other conventional methods of loading the table conveyor 6, such as the use of a crane and slings, may be utilized as desired.

The stalks are delivered from the downstream end of the table conveyor 6 to a main rising conveyor 8, next in the series. The main rising conveyor 8 moves faster than the table conveyor 6 and provides a thinning out of the mass of cane stalks due to the sudden acceleration of the stalks in passing between the conveyors.

Mounted above and adjacent the main rising conveyor between the receiving and delivery ends thereof is a metering comb 18 which is rotatably mounted on the adjacent base framework 17. The metering comb 18 includes a plurality of tines 20 which project outwardly from a central hub 22. The metering comb may be mounted so as to be movable toward and away from the main rising conveyor in order that the spacing between the ends of the tines 20 and the main rising conveyor may be adjusted. The metering comb is power driven in a direction opposed to the direction of travel of the stalk material by suitable drive means 23.

With the metering comb disposed at a suitable position relative to the main rising conveyor, rotation of the comb 18 causes the tines 20 to engage the heaps of stalk material being fed by the main rising conveyor. The tops of the heaps will be raked rearwardly (i.e., upstream) by the tines such that a generally even, or uniform, bed of stalk material is produced downstream of the metering comb (FIG. 8). In addition, the rearward raking of the stalk material is advantageous in that it may aid in untangling the mass of stalks.

As the uniform bed of stalk material reaches the delivery end of the main rising conveyor, it is transferred downwardly to an intermediate transport conveyor 10. The receiving end 24 of the intermediate transport conveyor 10 is positioned below and slightly forwardly of the delivery end of the main rising conveyor 8 to define a vertical gap, or discontinuity, 26 in the first conveyor series. Disposed within the discontinuity between the main rising conveyor 8 and the intermediate transport conveyor 10 is a raking and detrashing station 28 wherein the stalks are subjected to a further raking operation, as well as an initial cleaning operation.

This raking and detrashing station 28 includes a transfer drum 30 rotatably mounted adjacent the discharge end of the main rising conveyor 8, with its axis of rotation being transverse to the direction of stalk travel. The transfer drum includes a hub portion 32 and a plurality of arms or fingers 34 rigidly connected to the hub and projecting outwardly therefrom. The arms 34 are arranged circumferentially around the drum and axially along the drum in a relatively staggered orientation. Suitable drive means 33 is provided to rotate the drum in the direction of stalk travel (FIG. 8) and at a speed greater than the main rising conveyor 8.

The arms 34, as they rotate, will engage the mass of cane material being fed from the delivery end of the main rising conveyor 8 and will transfer this material over the drum and into the discontinuity 28. Since the transfer drum rotates faster than the stalk mass leaving the main rising conveyor 8, the arms 34 will tend to pull the mass apart, thereby tending to untangle the stalks. Consequently, the stalks will be dropped into the discontinuity 26 in a substantially untangled, as well as thinned out, condition.

Moreover, individual cane stalks which are fed by the transfer drum and which are engaged by the arms will be turned thereby (i.e., aligned) in the general direction of travel.

After being conveyed over the transfer drum the stalks are dropped into the gap 26 in a disentangling free-falling state toward the intermediate transport conveyor 10.

Suitably mounted on the framework 17 is a detrashing assembly which includes a fluid-directing device, preferably in the form of an air blower 36. The air blower is arranged to direct a stream of air, downwardly and laterally through the free-falling stalks. The rate of air flow is regulated such than the relatively heavy pieces of cane material will fall through the air stream, while the lighter pieces of trash, such as leaves and stems, will become entrained within and carried away by the air stream.

It is noted that by directing the air stream downwardly through the mass of stalks, rather than upwardly, the air stream is not required to overcome the effects of gravity as it picks up trash material, but rather is somewhat aided thereby.

Mounted at a position spaced from the intermediate transport conveyor and within the air stream is a trash-screening mechanism comprising a series of vertically oriented rod members 38. The rod members 38 are connected at their upper ends to the frame structure for individual, free-swinging movement by a suitable coupling, such as conventional hook and eye-bolt connections 40. It will be appreciated that any suitable connection affording free-swinging may be utilized, however.

The rod members 38 are disposed adjacent to the discontinuity 26 within the air stream to separate trash therefrom. Thus, trash particles which are entrained within the air stream will abut the free-swinging rod members and will drop downwardly out of the directed air. The free-swinging nature of the rod members 38 permits the rod members to flex relative to one another, thereby preventing pieces of trash material from becoming lodged therebetween as might occur with a non-flexible screen. Trash particles which drop out of the fluid stream are received by a removal conveyor 42 and are carried to a suitable dumping area.

It will be apparent that the mass of stalk material delivered by the main rising conveyor 8, after being subjected to the raking action of the transfer drum 30 and the detrashing effects of the air stream, will be carried off on the intermediate transfer conveyor 10 with the stalks being generally spread out laterally and longitudinally of the direction of travel and oriented more in alignment with the direction of travel.

It is noted that the intermediate transfer conveyor 10 may be arranged to run at a speed sufficiently great so that the leading portions of individual stalks, upon abutting this conveyor, are subjected to a downstream frictional accelerating force simultaneously with the disentangling falling motion through the gap 26. These combined forces exert a strong loosening and disentangling effect upon the cane stalks, thereby assisting in spreading and aligning the stalks in the direction of travel.

Although most of the stalk material which is fed to the transfer drum from the main rising conveyor 8 is directed downwardly onto the intermediate transport conveyor 10, some loose stalk material will fall downwardly through the spacing between the transfer drum 30 and the discharge end of the main rising conveyor 8, which spacing prevents engagement of the arms 34 with this conveyor. Also falling through this spacing will be dirt, stones and other trash material. Accordingly, the initial conveying series 5 includes a recycle conveyor system 44 operably arranged to receive this fallen stalk material, remove dirt and stones therefrom, and deposit the cleaned stalks back into the first conveyor assembly upstream of the raking mechanism.

The recycling conveyor system 44 consists of a lateral conveyor 46, a pair of secondary transfer conveyors 48 and 50, and a depositing ramp 56. The lateral conveyor 46 is disposed below the spacing between the drum 30 and the conveyor 8 to receive and remove the dirt, rock, and cane material which falls therethrough.

The secondary conveyor 48 is positioned below the discharge end of the lateral conveyor 46 and is oriented at a right angle relative thereto. The speed of the secondary conveyor 48 is greater than the speed of the lateral conveyor 46 and is regulated such as to produce, in combination with the right angle orientation, a disentangling and aligning effect upon the stalk material. This effect is discussed in more detail in the aforementioned U.S. Pat. No. 3,566,944 and will be discussed subsequently herein in relation to the right-angle junction 7. As a result, the secondary conveyor 48 will feed a mass of rocks, dirt and aligned cane stalks.

Between the secondary conveyors 48 and 50 there is provided a horizontal gap 52 through which fall a substantial part of the dirt, rocks, and other trash mixed among the stalks. The stalks, for the most part, are of sufficient length to span the gap 52, and thus will be propelled thereacross. A power-rotated drum 54 may be disposed above the gap at a height suitable to impart a frictional driving force to the stalks to assist in transferring the stalks across the gap. The secondary conveyor 50 delivers the stalks to an inclined, curved ramp 56 which deposits the stalks onto the main rising conveyor 8 upstream of its delivery end. The trash material which falls through the gap 52 may be subsequently disposed of.

SECOND SERIES OF CONVEYORS

After passing through the raking and fluid detrashing station 28, the stalks are delivered by the intermediate transfer conveyor 10 to the second series 9 of conveyors 58,60,62,64,66, and 67 which are oriented and operated to further align the stalks, and to remove therefrom additional trash, especially heavy debris such as rocks, boulders, and metallic objects.

The conveyors of the second series 9 are preferably of the power driven, endless, heavy duty, parallel slat type similar to the preferred conveyors of the first series. However, a conventional flexible belt type of conveyor could alternately be used if desired.

The right angle conveyor 58, the first conveyor in the second series, is supported in a horizontal posture on the base framework to receive stalk material delivered from the intermediate transfer conveyor 10. The right angle conveyor 58 is spaced vertically below and at right angles relative to the discharge end of the intermediate transfer conveyor 10 to define the right angle junction 7 between the first and second conveyor series.

The right angle conveyor is driven at a higher speed than the intermediate transfer conveyor 10 such that as the leading end of a falling stalk impinges upon the right angle conveyor 58, frictional engagement of the leading end therewith imparts an accelerating force to the leading end of the stalk in the downstream direction of travel of the right angle conveyor. Thus, the stalk is jerked in a direction transverse to that in which it has previously been traveling. At the same time, the rearward end of the stalk tends to be relatively retarded, not only by the inertia of the stalk itself, but frequently because of engagement of the rear end of the stalk with other canes in the mass. These acceleration forces produce a force couple acting on the individual stalks and tending to rotate each stalk in a direction toward alignment with the direction of travel of the right angle conveyor. Moreover, this combination of forces also tends to disentangle the cane stalks, which are otherwise prone to remain in their tangled condition due to their usually bent and twisted configuration.

Additionally, the stalks become spread out at the right angle junction. In this connection, it will be apparent that the stalks in the upper part of the mass are subjected to centrifugal force as they are propelled from the intermediate transfer conveyor 10 (to a greater extent than those in the lower part of the mass) with the result that the upper stalks are toppled radially outwardly at the right angle junction. Consequently, the mass of stalks are spread laterally across the right angle conveyor.

The stalks are fed by the right angle conveyor 58 to the magnetic detrashing station 69 where there is disposed a receiving conveyor 60. The right angle conveyor 58 and the adjacent receiving conveyor 60 are spaced apart at the magnetic detrashing station to define a horizontal gap 68 through which debris such as boulders and rocks may fall, with the aligned stalks being sufficiently long to span the gap. Disposed in the general location of the gap 68, is a magnetic flux-producing mechanism such as a magnet 70 of the permanent or electromagnetic type. The magnet may be mounted in any convenient fashion above or below the gap, but is preferably suspended from a frame 72, at a location sufficiently above the conveyors to accommodate a flow of stalk material therebeneath, while being capable of attracting metallic trash material. In this fashion, the metallic debris will be lifted out of the stream of flow of the stalk material. This removed metallic debris can be conveniently removed from the conveyor by any suitable operation.

Stalk material is deliverd by the receiving conveyor 60 to a detrashing roller conveyor assembly 62 (FIGS. 2 and 10) which defines the conveyor detrashing station 75 for removing additional remaining trash from the mass of stalks. The detrashing roller conveyor assembly 74 preferably includes two initial pairs of coacting feed rollers 76,78 and 80,82 which are mounted for rotation in suitable bearing members affixed to the base framework 17. Each of the upper rollers 75 and 80 is superposed above its associated lower roller 78 and 82 and is spaced therefrom to define a nip zone therebetween. The nip zones of the initial pairs of rollers are aligned to define a first direction of travel for the stalk material being fed by the rollers.

Disposed downstream of the initial pair of rollers are two additional pairs of feed rollers 84,86 and 88,90, respectively. These additional rollers are also mounted for rotation in suitable bearing members. Each of the additional upper rollers 84 and 88 is superposed above its associated lower roller 86 and 90 and is spaced therefrom to define a nip zone therebetween. The nip zones of the additional roller pairs are aligned to define a second path of travel for stalk material being fed by the additional rollers.

Significantly, this second direction of travel is arranged so as to be in a non-aligned relationship relative to the first direction of travel, with the lower additional roller 86, disposed at the junction between the initial and additional rollers, being located such that material, stalk or otherwise, which is propelled forwardly by the initial rollers 80,82 engages this junction roller 86 at a point below its nip zone. Since the rearward end of the stalks are gripped within the nip zone of the initial rollers 80 and 82, however, the rotating roller 86 will be able to deflect the relatively flexible stalks upwardly and into its nip zone for further gripping and feeding. Trash material such as dirt, rocks, boulders, leaves, etc., which is propelled toward the additional rollers will also strike the roller 86 at a point below its nip zone but, being unsupported at another location, will simply be deflected downwardly for convenient disposal. Thus, the lower roller 86 at the junction point functions as an abutment to deflect trash material downwardly. Preferably, the second direction of travel is arranged so as to be upwardly inclined relative to the first direction, as illustrated.

It is noted that the above-described arrangement of non-aligned directions of stalk travel with a roller functioning as an abutment, prevents heavy trash material from traveling through the rollers under its own momentum as would occur in the case where the rollers were arranged to define only one direction of travel for the stalk material.

Figure 2:
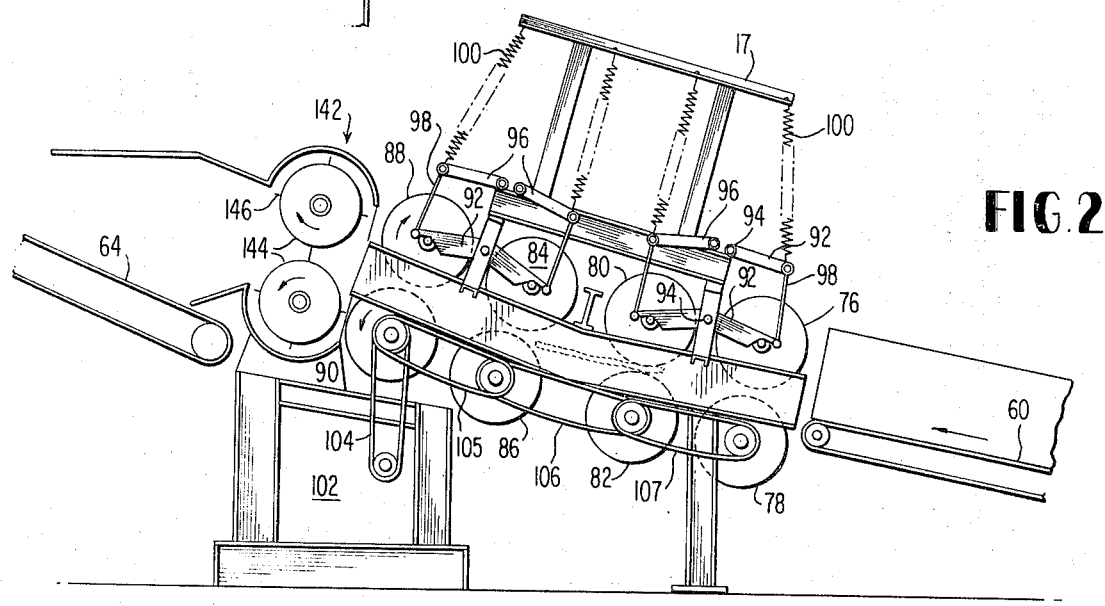
FIG. 2 is a side elevational view of one preferred embodiment of a detrashing conveyor assembly according to the invention.
Figure 10:
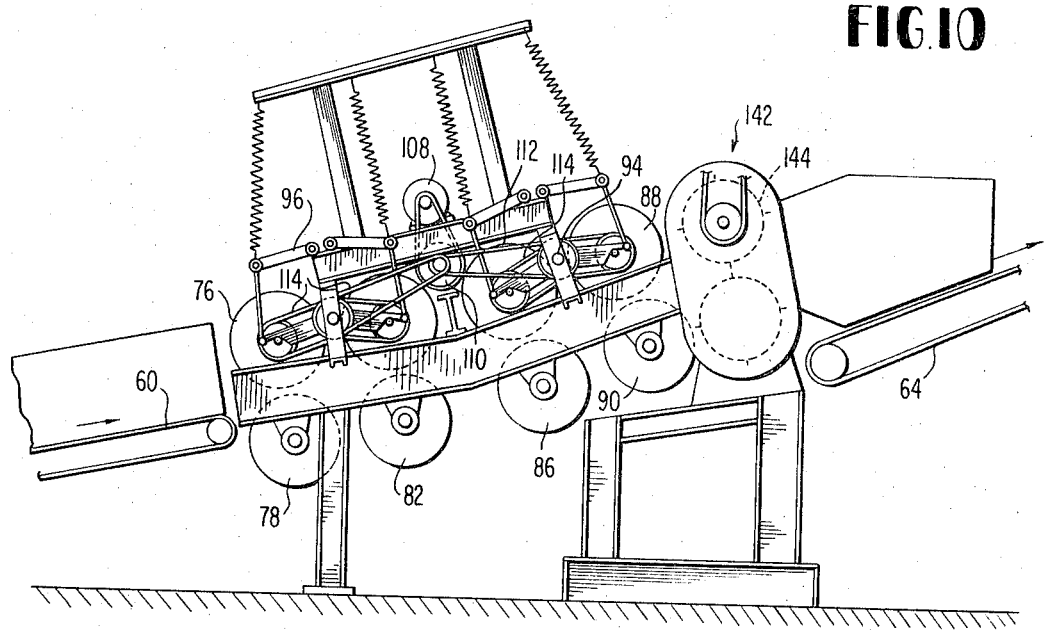
FIG. 10 is a view, similar to that of FIG. 2, of the opposite side of the detrashing conveyor assembly.

It is desirable that the rollers of the detrashing conveyor system 62 be able to easily accomodate the passage of varying volumes of stalks and large pieces of trash material therethrough and thus it is preferred that upper rollers 76,80,84 and 88 be mounted for shifting movement relative to their associated lower rollers. One suitable form of such mounting is shown in FIGS. 2 and 10 and comprises, for each of the upper rollers, a swing arm 92 pivotally mounted at its inner end at 94 and rotatably carrying a respective upper roller at its outer end by means of a suitable bearing. A support link 96 is pivotally mounted at its inner end to the base framework 17 and is linked at its outer end to the swing arm 92 by means of a connecting rod 98. The connecting rod 98 is pivotally coupled between the support link 96 and the swing arm 92 and is arranged to transmit forces to the upper roller from a yieldable element which is operably connected between the framework 17 and the support link 96. The yieldable element is preferably in the form of a tension spring 100 which limits downward movement of the upper roller while accomodating upward movement thereof as it conforms to conveyed stalk and trash material of varying thickness.

The drive train for the lower rollers is illustrated in FIG. 2 and includes a power plant 102 which is drivingly coupled to an axle-mounted sprocket wheel of the lower drums by means of sprocket chains 104–107 to drive each of the lower rollers at a uniform speed and in a common direction of rotation.

The drive train for the upper rollers is illustrated in FIG. 10 and includes a power plant 108 mounted on the base framework and coupled by a drive sprocket chain to a central sprocket wheel 110. The central sprocket wheel 110 drives a pair of sprocket chains 112, each of which drives a pair of secondary sprocket wheels (not shown) which are rotatably mounted on pivot 94 and which drive a pair of sprocket chains 114. Each of the sprocket chains 114 drives an axle-mounted sprocket wheel of the upper rollers and accomodates pivotal movement of the swing arms 92 while maintaining its driving connection to the rollers.

Although the detrashing roller conveyor assembly 62 has been described in conjunction with the use of two pairs of initial rollers and two pairs of additional rollers, it is noted that there need be a minimum of only one pair each of initial and additional rollers, it only being required that the rollers define a second direction of travel non-aligned with a first direction of travel as previously described. If desired, of course, three or more pairs each of initial and additional rollers could be utilized in accordance with the teachings of this invention.

Figure 3:
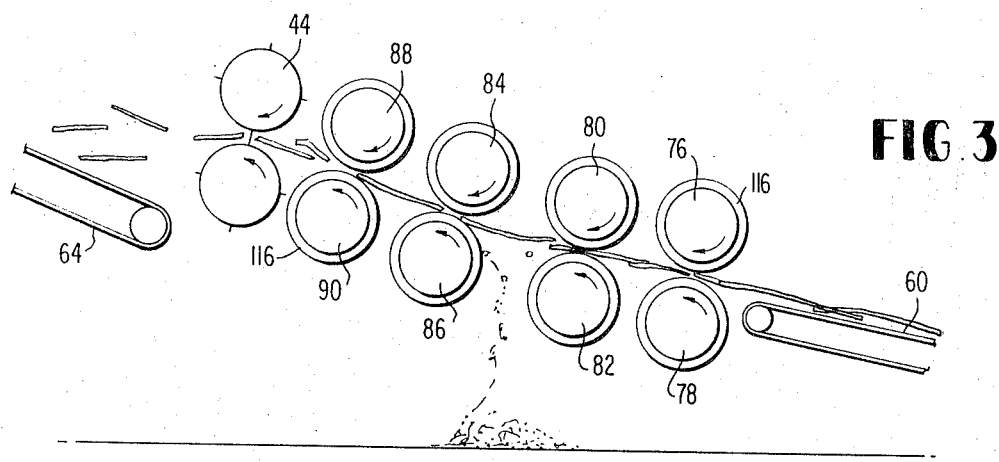
FIG. 3 is a side elevational, schematic view of a modified form of the detrashing conveyor assembly.

A modified form of the detrashing roller conveyor assembly is schematically illustrated in FIG. 3. In this embodiment, the feed rollers may be mounted in the same fashion as described in connection with FIGS. 2 and 10. The rollers are each provided with a resilient covering or sheath 116, such as rubber, for example. Such a resilient covering is inwardly flexible, under the influence of stalk material being fed, to provide an increased frictional gripping force on the stalks as well as enabling trash material to safely pass between the roller pairs. The resilient covering may be utilized in lieu of the yieldable mounting arrangement for the upper rollers described previously but is preferably used in conjunction therewith.

Figure 11:
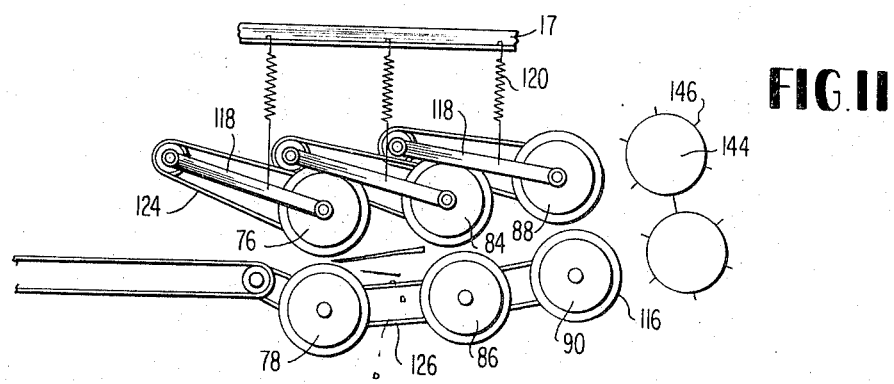
FIG. 11 is a side elevational, schematic view of another form of detrashing conveyor assembly according to the invention.

Another modified form of the improved detrashing roller conveyor assembly is shown in FIG. 11. In this embodiment only a single pair of initial coacting rollers 76 and 78 is employed in conjunction with two pairs of additional rollers 84,86 and 88, 90. Each of the rollers are illustrated having a resilient covering 116, although such covering is optional. The upper rollers 76,84 and 88 are mounted at outer ends of swing arms 118, the arms being freely pivotally supported at their inner ends. The upper rollers are suspended above their respective lower rollers by means of tension springs 120 which are hung from the base framework 17 and attached to the swing arms.

The upper rollers are driven by sprocket chains 122 which are connected to sprocket wheels 124 having a common axis with the swing arms 118. A suitable connection (not shown) to a power plant is provided to drive the sprocket wheels 124. The lower rollers are driven by sprocket chains 126 which are suitably coupled to a drive means, such as by a power take-off from the conveyor 60.

The initial rollers 76,78 are arranged to feed stalk material in a first direction of travel to a junction with the additional rollers. The additional rollers are oriented to feed the stalks along a second direction of travel inclined upwardly from the first direction. Consequently, rocks and other trash material will abut the lower roller 86 and be deflected downwardly.

Figure 12:
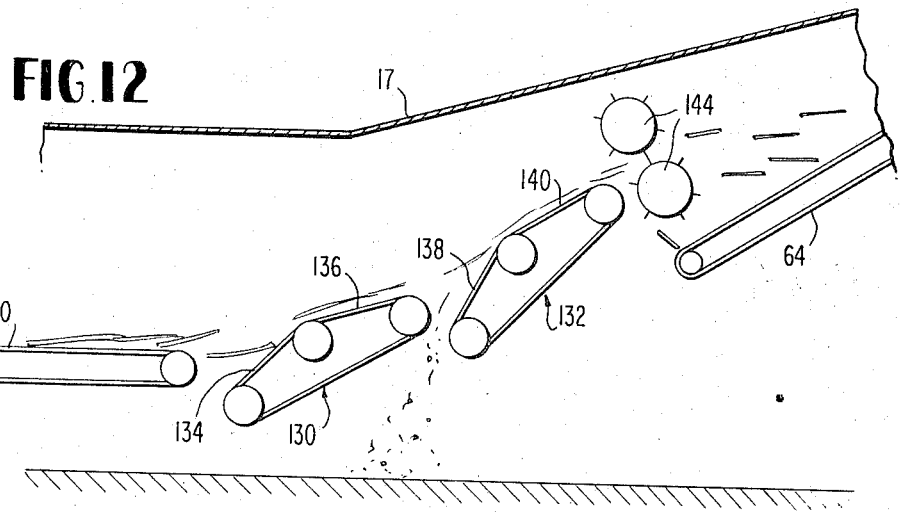
FIG. 12 is a side elevational, schematic view of still another form of detrashing assembly in accordance with the teachings of the invention.

A detrashing conveyor assembly 128 of the belt-type is illustrated in FIG. 12. This assembly includes a plurality of conveyor belts 130 and 132 which are arranged in series. The conveyor belts 130 each have two feed flights, namely an upstream flight 134,138 and a downstream flight 136, 140, respectively. The downstream flight of each conveyor belt is inclined downwardly with respect to its associated, contiguous upstream flight.

Significantly, the upstream flight 134 is spaced from and inclined upwardly with respect to the feed direction of the receiving conveyor 60, and the upstream flight 138 is spaced from and inclined upwardly relative to the downstream flight 136. In this fashion, stalk material which is directed against the upstream conveyor flight 134 will be carried upwardly thereby, while heavier trash material such as rocks will tend to fall backwardly on the conveyor belt 130 and drop between the conveyors 60 and 130. The stalk material, however, will be carried along the downstream flight 136 where its path of travel will be inclined downwardly relative to the upstream flight 134. Subsequently, the stalk material will be directed against the upstream flight 138 of the adjoining conveyor 132 where further detrashing will occur. The downstream flight 140 is arranged to feed the stalks to the next handling station.

It is noted that the angle between the conveyor 60 and the flight 134, as well as between the flight 136 and flight 138, is such that rocks striking the flights 134 and 138 tend to be deflected to eliminate the forward momentum thereof and thereby facilitate rearward movement of the rocks.

Disposed downstream of the detrashing conveyor assembly is a chopping station 142. The chopping station comprises a pair of coacting cutting rolls 144 each having four transversely extending, radially projecting knives 146 equally spaced about the cutter roll periphery. These knives 146 move into intermittent radial and contiguous alignment to sever each stalk transversely of its length. In this fashion, the cutter rolls 144 tend to produce chopped portions of stalk of uniform length.

The chopped portions of stalk are transported by a conveyor 64 to the top of a second fluid detrashing station 148. At this station the stalks are dropped from the discharge end of the conveyor 64 into a free-falling condition through a vertical gap between conveyors 64 and 66. A series of vertically spaced air blowers 152,154,156, and 158 are deployed along this gap and are operated to blow a stream of air laterally and downwardly across the falling stalk portions to pick up remaining bits of light trash material mixed among the stalks. The air stream is directed against a series of vertically hanging, free-swinging rod members 160 which are mounted similarly to the rods 38 and operate in the same manner. Thus trash material entrained within the air stream is removed therefrom by the rods 160 and is allowed to fall downwardly onto a waste conveyor 162. The rods are freely movable to prevent trash from being caught therein.

The stalk particles drop through the air stream and fall into a bin-like receptacle defined by the receiving end of the conveyor 66, a ramp 162, and the base framework 17. This arrangement is such that a pile-up of stalk portions within the bin is permitted. In this fashion the conveyor 66 functions as a surge-eliminating conveyor in that it feeds cane at a uniform rate in spite of irregularities in the rate of supply.

The conveyor 66 delivers the stalk portions to a hopper 164 from which they are removed by an out-feed conveyor 67 and deposited onto a shock-absorbing conveyor 166. The conveyor 166 delivers the stalk portions to a weighing conveyor 168 having suitable weighing equipment 170.

From this point the stalk portions may be delivered to subsequent porcessing stations in which the cane stalks may be separated into their individual components for yet further processing.

OPERATION

Sugarcane stalk material is transported by rail cars 14 to the table conveyor 6 out of which it is dumped (FIG. 1). The stalk material comprises heaps of cane stalks which are tangled together in random orientation and intermingled with trash such as dirt, rocks, boulders, leaves, and assorted metal objects.

The table conveyor 6 drops the stalk material onto the main rising conveyor 8 which, traveling faster than the table conveyor, tends to spreadout the stalk material in the direction of travel. Also, a certain amount of trash is permitted to fall rearwardly through the gap between these conveyors.

As the heaps of stalk material reach the raking zone of the conveyor system, they are engaged by the tines 20 of the metering comb and flipped rearwardly such that the heaps are leveled out and the bed of stalk material passing downstream of the metering comb is of generally uniform thickness.

From the discharge end of the main rising conveyor 8 the stalk material is fed to the transport drum 30. The rapidly moving arms 34 of of the drum 30 grab the stalk material in a manner tending to pull the individual stalks apart and convey the stalks over the drum and into the vertical discontinuity 26.

Air directed by the blower 36 passes laterally and downwardly through the stalks and picks up light pieces of trash such as small stems and leaves and carries them out of the stalk mass and against the freely swinging rods 38. The rods 38 function to screen out trash material from the air stream, allowing the trash to fall downwardly onto the removal conveyor 32. Due to their freely swinging nature, adjacent rods may separate to allow the trash to become dislodged, thereby preventing the screening rods from becoming clogged with trash material and requiring costly shut-downs in operation for cleaning purposes.

Stalk material which passes through the air stream drops onto the intermediate transport conveyor 10 on which it is delivered to the right angle junction 7. At this station the stalk material is flung onto the right angle conveyor 58 in a manner tending to untangle, align, and spread-out the stalks as previously described.

The aligned stalk material is then passed across the gap 68 through which falls dirt, stones, boulders and other trash material. At the same time, metallic trash which does not drop through the gap may be picked up by the magnet 70.

From the gap 68 the stalk material is conveyed to the detrashing conveyor assembly which may be of the type described in any of FIGS. 2,3,11 and 12. Here, the stalk material is fed through the initial feed rollers 76,78,80, and 82 (FIG. 2) in a first direction of travel toward the junction of the additional rollers 84,86,88, and 90 which are arranged to feed the stalk material in a second direction of travel inclined upwardly from the first. The leading ends of the stalks strike the lower additional roller 86 at the junction at a point below its nip zone. Since the stalks are being supported at their trailing ends by the initial rollers 80,82, however, they are deflected upwardly by the roller 86 into the nip zone and are carried off along the second direction of travel. Trash material, especially rocks, dirt, and boulders, which strike the roller 86 below the nip zone will simply be deflected downwardly for convenient removal.

Since the rollers are freely shiftably mounted by means of the flexible connectors 100, the upper rollers may shift relative to their associated lower rollers to conform to non-uniform stalk masses or to let large trash objects pass safely therethrough.

Additional gripping force on the stalk members may be provided by employing coverings 116 of resilient material around the rollers (FIG. 3).

In cases where the detrashing conveyor belt assembly of FIG. 12 is utilized, the stalk material is propelled onto the flight 134 of the conveyor belt 130 which is inclined upwardly relatively to the conveyor 60. Heavy trash material striking the flight 134 is deflected from its forward direction of travel and tends to travel rearwardly through the gap between the conveyors 60 and 130. The flight 136 of the conveyor 130 then redirects the stalk material in a comparatively downward direction where the stalk material is subjected to a similar operation in conjunction with a conveyor belt 132.

Subsequent to passage through the detrashing conveyor station, the stalks are subjected to a chopping operation by the cutting rollers 144 and are cut into relatively shorter uniform portions.

These stalk portions are then conveyed to the top of the vertical discontinuity at the downstream end of a conveyor 64 and are dropped therethrough in a freefalling condition. Air streams directed laterally and downwardly through the falling stalk portions by blowers 152, 154, 156, and 158 remove leaves and other light debris which may remain among the stalk portion and direct this debris against a plurality of vertically hanging, freely swinging rods 150 which operate in a similar fashion to the rods 38 to separate the debris from the air stream.

Finally, the stalk portions, in a chopped and substantially cleaned condition, may be carried at a generally uniform rate by the conveyor 66 into the plant 2 for further processing.

MAJOR ADVANTAGES AND SCOPE OF THE INVENTION

The detrashing roller conveyor assembly (FIGS. 2, 3, and 11) includes a plurality of roller pairs for feeding stalk material in a first direction and then in a second, non-aligned direction, with one of the rollers being suitably oriented at a junction point to deflect material downwardly while deflecting stalks upwardly into a nip zone. This dual-direction arrangement, with an abutment roller, serves to inhibit trash material from passing completely through the detrashing roller conveyor under its own momentum or while tangled among the mass of cane stalks as may occur with detrashing roller conveyors having only one direction of feed.

Also, by providing for free shifting movement of the upper rollers, accomodation is made for feeding stalk masses of non-uniform thickness as well as for feeding large trash objects safely.

The detrashing conveyor belt assembly of FIG. 12 employs the dual-direction teachings in a conveyor belt system wherein a single conveyor, e.g., 130, serves to detrash the stalks (along flight 134) and redirect the stalks (along flight 136) for another detrashing step.

The raking and fluid detrashing station 28 provides a compact, yet effective, arrangement for untangling and partially detrashing a tangled mass of stalk material in one simplified operation. This is accomplished in part by means of the drum 30 which functions to pull apart the mass of stalks, and by the blower 36 which directs a detrashing stream of air. By directing the detrashing fluid laterally and downwardly through the falling stalk material, the fluid does not have to overcome the effects of gravity to remove the trash, but is actually somewhat aided by gravity.

The use of freely-swinging rods 38 (and 160) as a trash screen serves to effectively separate trash from the air stream while preventing the trash particles from clogging the screen.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In an apparatus for preparing a mass of randomly oriented trash-containing sugarcane stalks for subsequent processing and which apparatus includes:

conveyor means for conveying the randomly oriented trash-containing mass of sugarcane stalks;
the conveyor means including aligning means for generally aligning substantially all of the stalks in the mass longitudinally in the direction of their conveyed travel;
chopping means disposed downwsteam of the aligning means and adjacent to the conveyor means, for receiving and chopping the aligned stalks transversely thereof into relatively shorter chopped lengths; and
detrashing means disposed upstream of the chopping means for treating the mass of stalks during travel thereof to remove trash;
the improvement wherein said detrashing means includes:
a detrashing station including at least one initial, coacting pair of rollers arranged to rotate in a first direction of stalk travel; the initial roller pair comprising an upper roller superposed vertically above a lower roller; said initial roller pair being arranged to positively engage and convey the mass of cane stalks therebetween in a first direction of travel to a junction of at least one additional pair of vertically superposed rollers arranged to rotate in a second direction of stalk travel; said additional roller pair disposed adjacent said initial roller pair and disposed to positively engage and convey the mass of cane stalks therebetween from said junction in a second direction inclined upwardly from said first direction; and the lower roller of said additional roller pair being positioned to deflect downwardly nonflexible trash material such as rocks.

2. The apparatus of claim 1, wherein said detrashing means further includes a transfer drum, disposed at a transfer point in the conveyor means and arranged to rotate in the direction of conveyed stalk travel for receiving and conveying stalks of cane over the drum and into a vertically extending discontinuity in the conveyor means, said drum having an axis of rotation transverse to said stalk travel direction and having a plurality of arms rigidly attached thereto and arranged to engage the mass of stalks during conveyed motion thereof to assist in conveying the stalks over said drum and into the discontinuity.

3. The apparatus of claim 2, further including recycle conveyor means positioned below the transfer point for conveying stalk material falling between the transfer drum and adjacent conveyor means and for depositing the stalk material on the conveyor means upstream of said transfer drum.

4. The apparatus of claim 1, wherein said detrashing means further includes fluid directing means disposed upstream of the chopping means and adjacent the conveyor means for directing fluid downwardly and laterally through the stalks as they drop through a vertically extending discontinuity in the conveyor means to disengage trash from the mass of stalks and convey the trash out of the discontinuity; and
a series of vertically hanging free-swinging rod members disposed adjacent to the discontinuity for receiving and screening trash from the directed fluid, with the trash dropping downwardly out of the directed fluid.

5. The apparatus of claim 1, wherein said at least one additional roller pair comprises two additional roller pairs for positively conveying the stalks from said junction; the axes of rotation for said initial and said additional rollers being parallel to each other; said rollers each including a resilient gripping surface for advancing stalks gripped between said gripping surfaces; and wherein the upper roller of each roller pair is freely shiftably mounted for movement toward and away from its associated lower roller.

6. The apparatus of claim 5, wherein said detrashing means further includes:
   a transfer drum, disposed at a transfer point in the conveyor means and arranged to rotate in the direction of conveyed stalk travel, for receiving and conveying stalks of cane over the drum and into a vertically extending discontinuity in the conveyor means; said drum having an axis of rotation transverse to said stalk travel direction and having a plurality of arms rigidly attached thereto and positioned to engage the mass of stalks during conveyed motion thereof to assist in conveying the mass of stalks over said drum and into the discontinuity;
   fluid directing means disposed upstream of the chopping means and adjacent the conveyor means for directing fluid downwardly and laterally through the stalks as they drop through the vertically extending discontinuity in the conveyor means to disengage trash from the mass of stalks and convey the trash out of the discontinuity;
   recycle conveying means positioned vertically below the transfer point for conveying stalk material falling between the transfer drum and adjacent conveyor means for depositing the stalk material on the conveyor means upstream of said transfer drum; and
   magnetic flux-producing means disposed upstream of the chopping means and adjacent the conveyor means for magnetically attracting trash from the mass of stalks.

7. In an apparatus for preparing a mass of randomly oriented trash-containing sugarcane stalks for subsequent longitudinal splitting and depithing of each individual stalk and which apparatus includes:
   a conveyor assembly comprising a series of conveyor means for conveying the randomly oriented trash-containing mass of sugarcane stalks from a dumping station;
   raking means disposed adjacent to the conveyor assembly for raking the mass of stalks, thinning the mass of stalks in the direction of travel, and spreading the mass of stalks laterally of the direction of travel, during conveyed travel of the stalk material;
   said conveyor assembly including aligning and thinning means downstream of the raking means for aligning and thinning substantially all of the stalks in the mass longitudinally in the general direction of their conveyed travel;
   chopping means disposed downstream of the aligning and thinning means and adjacent to the conveyor assembly for receiving and chopping the aligned stalks transversely thereof into relatively shorter chopped lengths; and
   first and second detrashing stations disposed upstream of the chopping means for removing trash from the mass of stalks;
the improvement wherein:
   said raking means includes a transfer drum, disposed at a transfer point between two of the conveyor means in the series and arranged to rotate in the direction of conveyed stalk travel, for receiving and conveying sugarcane stalks over the drum and into a vertically extending discontinuity in the conveyor assembly; the drum having an axis of rotation transverse to said stalk travel direction and having a plurality of arms rigidly attached thereto and arranged to engage the mass of stalks during conveyed travel thereof to assist in conveying the stalks over the drum and into the discontinuity, and the drum being spaced from an adjacent conveyor means to allow unobstructed rotation of the drum;
   the first detrashing station including fluid direction means disposed adjacent the transfer drum and the conveyor assembly for directing fluid downwardly and laterally through the stalks, as they drop through the discontinuity and onto the conveyor means for further conveying, to disengage trash from the mass of stalks and convey the trash out of the discontinuity; and a series of vertically hanging free-swinging rod members disposed adjacent the vertical discontinuity for receiving and screening the trash from the directed fluid, with the trash dropping downwardly out of the directed fluid; and
   said second detrashing station being disposed between two of the conveyor means in the series at a point downstream of the transfer drum and upstream of the chopping means and including first and second pairs of coacting rollers, the first and second pairs being spaced apart in the direction of conveyed stalk travel, with each pair comprising an upper roller superposed vertically above a lower roller, the first and second roller pairs being arranged to positively feed and convey cane stalks along a first direction of stalk travel to a junction of at least one additional pair of vertically superposed rollers, the additional roller pair being spaced downstream from the first and second roller pairs to positively feed and convey the cane stalks from said junction in a direction inclined upwardly from said first direction, the lower of the additional roller pair being positioned to deflect downwardly nonflexible trash material such as rocks.

8. The apparatus of claim 7, wherein said at least one additional roller pair comprises two additional roller pairs for positively conveying the sugarcane stalks from said junction, and wherein the upper roller of each roller pair is freely shiftably mounted for movement toward and away from its associated lower roller.

9. The apparatus of claim 7, wherein said conveyor assembly includes:
   recycle conveyor means positioned vertically below the transfer point for conveying stalk material falling between the transfer drum and an adjacent conveyor means and for depositing this fallen stalk material on the conveyor means between the dumping station and the transfer point; and
   magnetic flux-producing means disposed upstream of the chopping means and adjacent the conveyor assembly for magnetically attracting trash from the mass of stalks.

10. In an apparatus for preparing a mass of sugarcane stalks for subsequent processing and which apparatus includes:
   conveyor means for conveying the mass of sugarcane stalks and including aligning means for aligning substantially all of the stalks in the mass longitudinally in the general direction of their conveyed travel;

chopping means disposed upstream of the aligning means and adjacent to the conveyor means for receiving and chopping the aligned stalks transversely thereof into relatively shorter chopped lengths; and detrashing means disposed upstream of the chopping means for treating the mass of stalks at some point during travel thereof to remove trash; the improvement wherein said detrashing means includes:

air directing means disposed adjacent to the conveyor means and arranged to direct a stream of air downwardly and laterally through the stalks as the stalks drop through a vertically extending discontinuity in the conveyor means to disengage trash from the mass of stalks and convey the trash away from the falling stalks; and a series of vertically hanging free-swinging rod members, the rod members being disposed within the air stream and arranged to receive and screen trash from the air stream, with the trash dropping downwardly out of the air stream.

11. In an apparatus for preparing a mass of randomly oriented trash-containing sugarcane stalks for subsequent processing and which apparatus includes conveyor means for conveying the mass of sugarcane stalks and including aligning means for aligning substantially all of the stalks in the mass longitudinally in the general direction of their conveyed travel;

chopping means disposed downstream of the aligning means and adjacent to the conveyor means for receiving and chopping the aligned stalks transversely thereof into relatively shorter chopped lengths; and detrashing means disposed upstream of the chopping means for treating the mass of stalks at some point during their travel to remove trash;

the improvement wherein said detrashing means comprises:

a first endless conveyor belt for directing the mass of cane stalks in a first direction of travel;

a second endless conveyor belt disposed adjacent to and spaced from said first conveyor belt to define a gap therebetween, said second conveyor belt including:

a first conveying flight disposed in generally facing relation to said first conveyor belt and being inclined upwardly relative thereto, said first flight being arranged to receive the mass of stalks from said first conveyor belt and convey the mass of stalks along a second direction of travel, and a second conveying flight being inclined downwardly relative to said first flight for redirecting the mass of stalk material along a third path of travel;

the relative inclination between said first conveyor belt and said first flight of said second conveyor belt being arranged to cause trash material, such as rocks, to deflect downwardly through the gap between said first and second conveyor belts; and a third endless conveyor belt disposed adjacent to and spaced from said second conveyor belt to define a gap therebetween, said second conveyor belt including:

an initial conveying flight disposed in generally facing relation to said second flight of said second conveyor belt and being inclined upwardly thereto, said initial flight being arranged to receive the mass of stalks from said second flight and convey the mass of stalks along a fourth direction of travel, and a delivery flight inclined downwardly relative to said initial flight for directing the mass of stalks along a fifth path of travel;

the relative inclination between said second conveyor flight and said initial flight being arranged to cause trash material such as rocks, to deflect downwardly through the gap between second and third conveyor belts.

12. An apparatus for preparing a mass of randomly oriented trash-containing sugarcane stalks for subsequent processing comprising:

a first series of conveyors arranged to feed the stalk material from a dumping station to a right angle junction and including a first conveyor belt;

a metering comb disposed above said first conveyor belt intermediate its ends; said metering comb including a plurality of tines projecting outwardly from a central hub; means for rotating said metering comb such that said tines engage the stalk material opposite the direction of stalk travel to level said stalk material and provide a generally uniform bed of stalk material for transport to the discharge end of said first conveyor belt;

said first series of conveyors including a second conveyor belt having a receiving end disposed below the discharge end of said first conveyor belt to define a vertical discontinuity in said first series of conveyors;

a transfer drum, disposed adjacent the discharge end of said first conveyor belt and arranged to rotate in the direction of conveyed stalk travel, for receiving and conveying the stalks of cane over the drum and into the vertical discontinuity; said drum having an axis of rotation transverse to said stalk travel direction and having a plurality of arms rigidly thereto and positioned to engage the mass of stalks during conveyed motion thereof to assist in conveying the mass of stalks over said drum and into the discontinuity;

air directing means for directing air downwardly and laterally through the stalks as they drop through the vertically extending discontinuity to disengage trash from the mass of stalks and convey the trash out of the discontinuity;

a series of vertically hanging, free-swinging rod members disposed within the air stream for receiving and screening trash from the air stream, with the trash downwardly out of the air stream;

recycle conveying means positioned for receiving and conveying stalk material falling between said transfer drum and said first conveyor belt and for depositing the fallen stalk material onto the first conveyor belt upstream of said transfer drum; said recycle conveying means including a right angle junction for untangling, spreading-out and aligning cane stalks in said mass, and a gap for causing trash material to fall from among the stalks being re-conveyed;

a second series of conveyors including a third conveyor belt disposed below and at a right angle relative to a terminal conveyor of said first series to define the right angle junction; said third conveyor and said terminal conveyor being cooperably arranged to impose forces on said mass of stalk material tending to untangle, spread-out, and align the stalks on said third conveyor belt;

magnetic flux producing means disposed adjacent the second series of conveyors for magnetically attracting trash from the mass of stalks;

a detrashing station disposed downstream of said right angle junction and including at least one initial, coacting pair of rollers arranged to rotate in a first direction of stalk travel; the initial roller pair comprising an upper roller superposed vertically above a lower roller; said initial roller pair being arranged to positively engage and convey the mass of cane stalks therebetween in a first direction of travel to a junction of at least one additional pair of vertically superposed rollers arranged to rotate in a second direction of stalk travel; said additional roller disposed adjacent said initial roller pair and disposed to positively engage and convey the mass of cane stalks therebetween from said junction in a second direction inclined upwardly from said first direction; and the lower roller of said additional roller pair being positioned to deflect downwardly nonflexible trash material such as rocks; and chopping means, disposed downstream of the detrashing station adjacent to the second conveyor series, for receiving and chopping the aligned stalks transversely thereof into relatively shorter chopped lengths.

13. In a method for preparing a mass of randomly oriented trash-containing sugarcane stalks for subsequent longitudinal splitting and depithing of each individual stalk and which method includes conveying the randomly oriented trash-containing mass of sugarcane stalks from a dumping station on a series of conveying means;

aligning and thinning substantially all of the stalks in the mass longitudinally in the general direction of their conveyed travel; and chopping the aligned stalks transversely thereof into relatively shorter chopped lengths; and treating the mass of stalk material during travel thereof to remove trash therefrom; the improvement wherein the step of treating comprises the steps of:

feeding the mass of cane stalks to at least one initial pair of upper and lower superposed rollers, conveying the mass of cane stalks between the initial rollers in a first direction of travel to a junction of at least one additional pair of upper and lower superposed rollers;

conveying the mass of cane stalks from said junction in a second direction of travel between said additional rollers and inclined upwardly from said first direction of travel, and deflecting downwardly non-flexible trash, such as rocks, which abut against the lower one of said additional pairs of rollers at the junction.

14. The method of claim 13 wherein:

the step of conveying in a first direction includes the steps of conveying the mass of cane stalks between said initial rollers to the junction of at least two additional pairs of upper and lower superposed rollers; the initial and additional rollers being rotated about parallel axes;

the steps of conveying in a first and second direction each including the step of resiliently gripping the stalk material between resilient gripping surfaces disposed on the initial and additional rollers.

15. In a method for preparing a mass of randomly oriented trash-containing sugarcane stalks for subsequent longitudinal splitting and depithing of each individual stalk and which method includes conveying the randomly oriented trash-containing mass of sugarcane stalks from a dumping station on a series of conveying means;

aligning and thinning substantially all of the stalks in the mass longitudinally in the general direction of their conveyed travel; and chopping the aligned stalks transversely thereof into relatively shorter chopped lengths; and treating the mass of stalk material during travel thereof to remove trash therefrom;

the improvement wherein the step of treating comprises the steps of:

feeding the mass of cane stalks to at least one initial pair of upper and lower superposed rollers, conveying the mass of cane stalks between the initial rollers in a first direction of travel to a junction of at least one additional pair of upper and lower superposed rollers;

conveying the mass of cane stalk stalks from said junction in a second direction of travel between said additional rollers and inclined upwardly from said first direction of travel, deflecting downwardly non-flexible trash, such as rocks, which abut against the lower one of said additional pair of rollers at the junction.

raking the mass of stalks by providing a transfer drum disposed at a transfer point between two of the conveying means in the series and rotating the drum in the direction of conveyed stalk travel to convey stalks of sugarcane over the drum and into a vertically extending discontinuity between said two conveying means, the drum rotation causing rigid arms on the drum to engage the mass of stalks during conveyed travel thereof to assist in conveying the stalks over the drum and into the discontinuity;

directing fluid downwardly and laterally through the mass of stalks as the mass of stalks falls through the discontinuity and onto the conveying means for further conveying, the directed fluid disengaging trash from the mass of stalks and conveying the trash out of the discontinuity; and directing the fluid and the trash entrained therein toward a series of vertically hanging, free-swinging rod members, and causing the rod members to screen the trash from the directed fluid while allowing the trash to drop downwardly out of the directed fluid.

16. In a method for preparing a mass of randomly oriented, trash-containing sugarcane stalks for subsequent longitudinal splitting and depithing of each individual stalk and which method includes conveying the mass of sugarcane stalks from a dumping station on a conveying means;

aligning and thinning substantially all of the stalks in the mass longitudinally in the general direction of their conveyed travel;

chopping the aligned stalks transversely thereof into relatively shorter chopped lengths; and directing the fluid through the mass of stalks at some point during travel thereof to remove trash; the improvement wherein said step of directing includes:

dropping the mass of stalk material from a discharge end of the conveying means into a free-flight, vertical fall;

directing fluid downwardly and laterally through the mass of falling stalks to disengage the trash from the mass of stalks and convey the trash out of the discontinuity; and directing the fluid and the trash entrained therein toward a series of vertically hanging, free-swinging rod members, and causing the rod members to screen the trash from the directed fluid while allowing the trash to drop downwardly out of the directed fluid.

17. In a method for preparing a mass of randomly oriented trash-containing sugarcane stalks for subsequent longitudinal splitting and depithing of each individual stalks and which method includes conveying the mass of stalks from a dumping station on a series of conveying means;

raking the mass of stalks during conveyed travel thereof to assist in thinning the mass of stalks in the direction of travel and in spreading the mass of stalks laterally of the direction of travel;

aligning and thinning substantially all of the stalks in the mass longitudinally in the general direction of conveyed travel; and chopping the aligned stalks transversely thereof into relatively shorter chopped lengths;

directing fluid through the mass of stalks during travel to remove trash;

the improvement wherein saids steps of raking and directing include:

passing the mass of stalks over a rotating transfer drum and into a vertically extending discontinuity between said two conveying means such that stalks are engaged and pulled over the drum by rigid arms on the drum;

directing fluid downwardly and laterally through the mass of stalks as the mass of stalks falls through the discontinuity and onto the conveying means for further conveying, the directed fluid disengaging trash from the mass of stalks and conveying the trash out of the discontinuity and directing the fluid and the trash entrained therein toward a series of vertically hanging, free-swinging rod members and causing the rod members to screen the trash from the directed fluid while allowing the trash to drop downwardly out of the directed fluid.

18. In a method for preparing a mass of randomly oriented, trash-containing sugarcane stalks for subsequent longitudinal splitting and depithing of each individual stalk and which method includes conveying the mass of sugarcane stalks from a dumping station on a first conveyor belt;

passing the stalk material beneath a rotating metering comb disposed above said first conveyor belt such that tines of said metering comb engage the stalk material opposite the direction of stalk travel to level such stalk material and provide a generally uniform bed of stalk material for transport to the discharge end of said first conveyor belt;

passing the mass of stalk material over a rotating transfer drum and into a vertically extending discontinuity between said first conveyor belt and a second conveyor belt such that the stalk material is engaged and pulled over the drum by rigid arms on the drum;

directing air downwardly and laterally through the mass of stalks as they drop through the vertically extending discontinuity to disengage trash from the mass of stalks to convey the trash out of the discontinuity;

directing the air and the trash entrained therein toward a series of vertically hanging, free-swinging rod members to screen the trash from the directed air while allowing the trash to drop downwardly out of the directed air;

directing stalk material falling between said transfer drum and said first conveyor belt onto a first recycle conveyor belt, discharging the fallen stalk material onto a second, right angle recycle conveyor belt to untangle, spread-out, and align cane stalks in said mass, passing the fallen stalk material across a gap disposed between said second recycle conveyor belt and a third recycle conveyor belt to cause trash material to fall downwardly from among the fallen stalk material, and depositing the fallen stalk material onto said first conveyor belt upstream of said metering comb;

discharging the stalk material from said second conveyor belt onto a third, right angle conveyor belt to untangle, spread-out, and align the stalks on said third conveyor belt;

passing the stalk material adjacent a magnetic flux producing means to magnetically attract trash from the mass of stalks;

conveying the mass of cane stalks between at least one pair of vertically superposed rollers in a first direction of travel to a junction of at least one additional pair of vertically superposed rollers, conveying the mass of stalk material from said junction in a second direction of travel between said additional rollers and inclined upwardly from said first direction of travel, and deflecting downwardly nonflexible trash, such as rocks, which abut against the lower one of said additional pair of rollers at the junction; and chopping the stalks transversely thereof into relatively shorter chopped lengths.

* * * * *